(12) United States Patent
Hailu et al.

(10) Patent No.: US 7,157,161 B1
(45) Date of Patent: Jan. 2, 2007

(54) CRB AND CRMOB AS THIRD UNDERLAYER TO REFINE GRAINS

(75) Inventors: Abebe Hailu, San Jose, CA (US); Charles Changging Chen, Milpitas, CA (US); Mariana R. Munteanu, Santa Clara, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/854,433

(22) Filed: May 27, 2004

(51) Int. Cl.
G11B 5/66 (2006.01)
G11B 5/70 (2006.01)

(52) U.S. Cl. ...................... 428/831; 427/131
(58) Field of Classification Search .......... 428/694 TS, 428/694 TM, 900, 611, 667, 668, 831, 831.2, 428/828
See application file for complete search history.

(56) References Cited

U.S. PATENT DOCUMENTS

| | | | |
|---|---|---|---|
| 5,824,427 A | 10/1998 | Kobayashi et al. | 428/694 TS |
| 6,090,496 A | 7/2000 | Kanazawa et al. | 428/617 |
| 6,150,016 A * | 11/2000 | Song et al. | 428/332 |
| 6,183,860 B1 | 2/2001 | Cheng et al. | 428/336 |
| 6,605,374 B1 * | 8/2003 | Ishikawa et al. | 428/694 T |
| 6,821,652 B1 * | 11/2004 | Okamoto et al. | 428/694 TM |
| 6,830,837 B1 * | 12/2004 | Kanbe et al. | 428/694 TM |
| 2003/0076632 A1 | 4/2003 | Sakai et al. | 360/131 |
| 2003/0148143 A1 * | 8/2003 | Kanbe et al. | 428/694 TS |
| 2003/0186086 A1 * | 10/2003 | Abarra et al. | 428/694 TS |
| 2005/0158588 A1 * | 7/2005 | Malhotra et al. | 428/694 TM |

* cited by examiner

*Primary Examiner*—Holly Rickman
(74) *Attorney, Agent, or Firm*—Morrison & Foerster LLP

(57) ABSTRACT

The Hr and SNR of a magnetic recording medium are increased and the signal pulse narrowed by employing a tri-layer underlayer structure containing Cr or a Cr alloy wherein the second underlayer contains Cr and B, the first underlayer preferably contains substantially pure Cr, and the third underlayer preferably contains a ternary alloy of Cr.

15 Claims, 3 Drawing Sheets

AFC Media

| Protective layer |
|---|
| Co-based Magnetic layer (s) |
| Spacer Layer Ru Fe, |
| Intermediate layer 1 (CoCr, CoCrTa, CoCrPt) |
| Underlayer_3 Ternary Cr(V, MO, W, Ta, Mn, Ru & Nb |
| Underlayer_2 Binary/Ternary Cr (Hf, Ta, Sc, B, Mo Ag &Al) |
| Underlayer_1 Cr |
| Seed layer (Optional) |
| Substrate |

Conventional Media

| Protective layer |
|---|
| Co-based Magnetic layer (s) |
| Intermediate layer 1 (CoCr, CoCrTa, CoCrPt) |
| Underlayer_3 Ternary Cr(V, MO, W, Ta, Mn, Ru & Nb |
| Underlayer_2 Binary/Ternary Cr (Hf, Ta, Sc, B, Mo Ag &Al) |
| Underlayer_1 Cr |
| Seed layer (Optional) |
| Substrate |

Figure 2

AFC Media

| Protective layer |
|---|
| Co-based Magnetic layer (s) |
| Spacer Layer Ru Fe, |
| Intermediate layer 1 (CoCr, CoCrTa, CoCrPt) |
| Underlayer_3 Ternary Cr(V, MO, W, Ta, Mn, Ru & Nb |
| Underlayer_2 Binary/Ternary Cr (Hf, Ta, Sc, B, Mo Ag & Al) |
| Underlayer_1 Cr |
| Seed layer (Optional) |
| Substrate |

Conventional Media

| Protective layer |
|---|
| Co-based Magnetic layer (s) |
| Intermediate layer 1 (CoCr, CoCrTa, CoCrPt) |
| Underlayer_3 Ternary Cr(V, MO, W, Ta, Mn, Ru & Nb |
| Underlayer_2 Binary/Ternary Cr (Hf, Ta, Sc, B, Mo Ag & Al) |
| Underlayer_1 Cr |
| Seed layer (Optional) |
| Substrate |

…

CRB AND CRMOB AS THIRD UNDERLAYER TO REFINE GRAINS

FIELD OF INVENTION

The present invention relates to magnetic recording media, such as thin film magnetic recording disks. The present invention has particular applicability to high areal density magnetic recording media exhibiting low noise, high remanent coercivity and reduced recording signal modulation.

BACKGROUND

FIG. 1 shows the schematic arrangement of a magnetic disc drive 10 using a rotary actuator. A disc or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disc 11. The rotary actuator could have several suspensions and multiple magnetic heads to allow for simultaneous recording and reproduction on and from both surfaces of each medium.

An electromagnetic converting portion (not shown) for recording/reproducing information is mounted on the magnetic head 13. The arm 15 has a bobbin portion for holding a driving coil (not shown). A voice coil motor 19 as a kind of linear motor is provided to the other end of the arm 15. The voice motor 19 has the driving coil wound on the bobbin portion of the arm 15 and a magnetic circuit (not shown). The magnetic circuit comprises a permanent magnet and a counter yoke. The magnetic circuit opposes the driving coil to sandwich it. The arm 15 is swingably supported by ball bearings (not shown) provided at the upper and lower portions of a pivot portion 17. The ball bearings provided around the pivot portion 17 are held by a carriage portion (not shown).

A magnetic head support mechanism is controlled by a positioning servo driving system. The positioning servo driving system comprises a feedback control circuit having a head position detection sensor (not shown), a power supply (not shown), and a controller (not shown). When a signal is supplied from the controller to the respective power supplies based on the detection result of the position of the magnetic head 13, the driving coil of the voice coil motor 19 and the piezoelectric element (not shown) of the head portion are driven.

When a magnetic filed is applied to a magnetic material, the domains most nearly parallel to the direction of the applied field grow in size at the expense of the others. This is called boundary displacement of the domains or the domain growth. A further increase in magnetic field causes more domains to rotate and align parallel to the applied field. When the material reaches the point of saturation magnetization, no further domain growth would take place on increasing the strength of the magnetic field.

The ease of magnetization or demagnetization of a magnetic material depends on the crystal structure, grain orientation, the state of strain, and the direction and strength of the magnetic field. The magnetization is most easily obtained along the easy axis of magnetization but most difficult along the hard axis of magnetization. A magnetic material is said to possess a magnetic anisotropy when easy and hard axes exist. On the other hand, a magnetic material is said to be isotropic when there are no easy or hard axes.

In a perpendicular recording media, magnetization is formed easily in a direction perpendicular to the surface of a magnetic medium, typically a magnetic layer on a suitable substrate, resulting from perpendicular anisotropy in the magnetic layer. On the other hand, in a longitudinal recording media, magnetization is formed in a direction in a plane parallel to the surface of the magnetic layer, resulting from longitudinal anisotropy in the magnetic layer.

The requirement for increasingly high areal recording density imposes increasingly greater demands on thin film magnetic recording media in terms of remanent coercivity (Hr), magnetic remanance (Mr), coercivity squareness (S*), medium noise, i.e., signal-to-noise ratio (SNR), and narrow track recording performance. Efforts to produce a magnetic recording medium satisfying such demanding requirements confront significant challenges.

The linear recording density can be increased by increasing the coercivity of the magnetic recording medium. However, this objective can only be accomplished by decreasing the medium noise, as by maintaining very fine magnetically non-coupled grains. Medium noise is a dominant factor restricting increased recording density of high density magnetic hard disc drives. Medium noise in thin films is attributed primarily to inhomogeneous grain size and intergranular exchange coupling. Accordingly, in order to increase linear density, medium noise must be minimized by suitable microstructure control.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is recognized that underlayers having a fine grain structure are highly desirable, particular for epitaxially growing fine grains of hexagonal close packed (HCP) Co alloys deposited thereon.

As the demand for high areal recording density increases, the requirements for high recording signal, low media noise and narrow transitions become increasingly difficult to simultaneously satisfy, thereby imposing great demands on film structure design and fabrication techniques. Efforts have been made to explore new types of magnetic and underlayer materials, design new multi-layer thin film structures and manipulate various thin film deposition parameters in attempting to improve magnetic properties and information read/write processes. However, there remains a need for increasingly high areal recording density magnetic recording media exhibiting Hr, high SNR, and narrow signal pulse.

One of the purposes of underlayers has been to nucleate the magnetic film that is subsequently deposited by establishing a match of lattice constant to enhance coercive force and squareness. However, to further extend the increase of areal recording density, a proper choice of underlayers to both reduce grain size and better control crystallographic orientation is desired.

SUMMARY OF THE INVENTION

A process has been developed which uses a three-underlayer structure for high-density recording. This invention relates to improving the signal to noise ratio of magnetic recording medium (SmNR) via improving the refinement of the grains by employing an additive of non-soluble element such as B and Mo to the second Cr underlayer. The enhancement has been achieved with better crystallographic orien tation and alignment. Good lattice match grain-to-grain epitaxal growth for both anti-ferromagnetically coupled (AFC) and conventional (not AFC) media.

One embodiment is a magnetic recording medium comprising a non-magnetic substrate, a first underlayer comprising chromium (Cr) or a Cr alloy on the substrate, a second underlayer comprising Cr and B on the first underlayer and a third underlayer comprising an alloy of Cr on the second underlayer, and a magnetic layer on the third underlayer. Preferably, the first underlayer comprises substantially pure Cr. Preferably, the second underlayer further comprises Hf, Ta, Sc, Mo Ag, Al or combination. Preferably, B, Hf, Ta, Sc, Mo Ag or Al is in a range of 0.1 to 35 at. %. Preferably, Hf, Ta, Sc, Mo Ag or Al is dispersed primarily at grain boundaries of the Cr or Cr alloy. Preferably, the third underlayer comprises a ternary alloy of Cr, V, Mo, W, Ta, Mn, Ru, Nb or combination thereof. Preferably, V, Mo, W, Ta, Mn, Ru, Nb is dispersed primarily at grain boundaries of the Cr or Cr alloy. Preferably, the second underlayer further comprises Mo. The magnetic recording medium could further comprise an intermediate layer of CoCr, CoCrTa or CoCrPt between the third underlayer and the magnetic layer and a spacer layer comprising RuFe between the intermediate layer and the magnetic layer. Preferably, the first underlayer contains substantially pure Cr, the second underlayer contains $CrB_x$, wherein $0.1 \leq x \leq 15$, the third underlayer contains CrMoTa and the magnetic layer contains CoCrPtB, the magnetic recording medium further comprising an intermediate layer containing CoCrTa and a spacer layer containing RuFe between the third underlayer and the magnetic layer.

Another embodiment is a method of manufacturing a magnetic recording medium comprising obtaining a non-magnetic substrate, depositing a first underlayer comprising chromium (Cr) or a Cr alloy on the substrate, depositing a second underlayer comprising Cr and B on the first underlayer and depositing a third underlayer comprising an alloy of Cr on the second underlayer, and depositing a magnetic layer on the third underlayer.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

FIG. 2 shows AFC and conventional media designs with the tri-layer underlayers of this invention.

DETAILED DESCRIPTION

Figure 1:
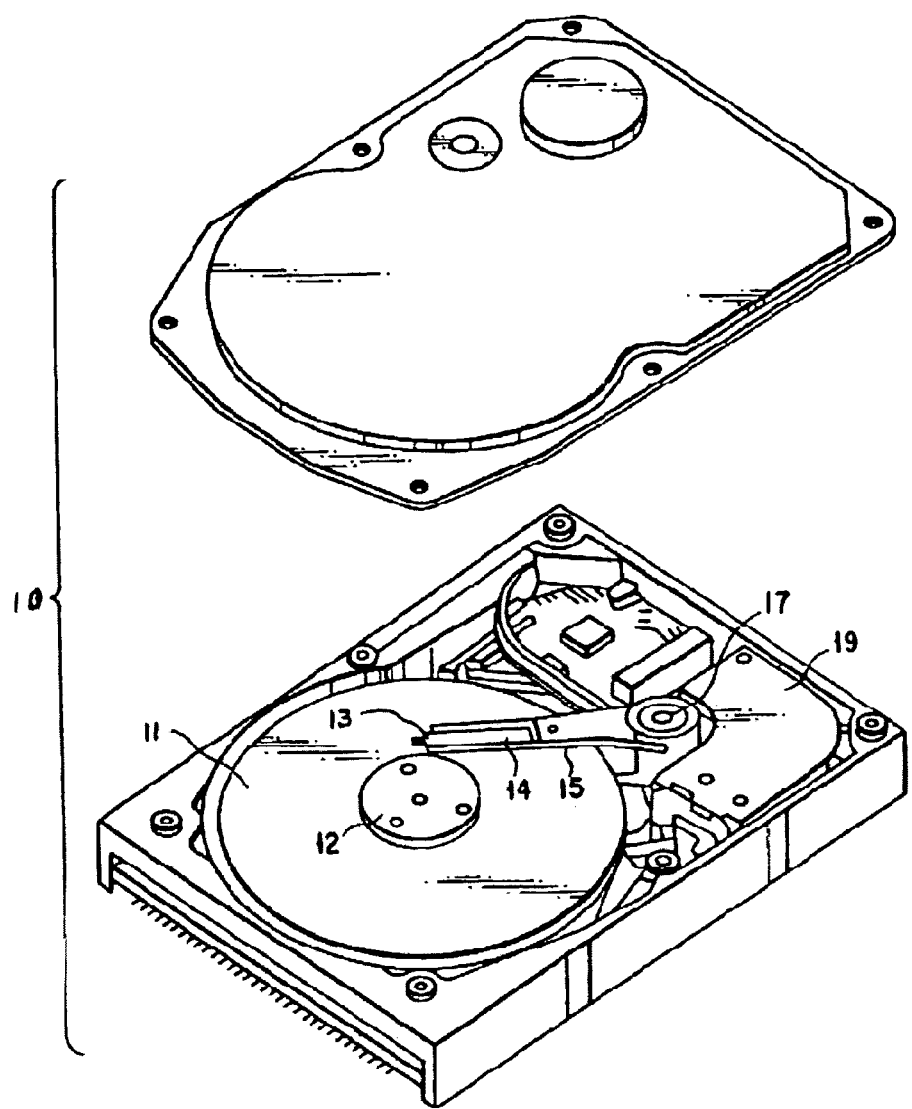
FIG. 1 is a view of a magnetic disc drive.

The present invention provides magnetic recording media suitable for high areal recording density exhibiting high Hr, high SNR and a narrow signal pulse as evidenced by measurements of FWHM (full width at half maximum) of XRD rocking curves. In embodiments of the present invention, the objectives of high areal recording density, high Hr, high SNR and narrow signal pulse are achieved by the strategic formation of multiple underlayers comprising Cr or a Cr alloy containing B, Mo, or combinations, for example, dispersed within the Cr or Cr alloy.

Embodiments of the present invention comprise sputter depositing the first, second and third underlayers from one or more targets containing Cr or a Cr alloy layer. Particularly advantageous results have been achieved by employing a three layer underlayer structure comprising a first underlayer of Cr or a Cr alloy, a second underlayer comprising Cr or a Cr alloy layer having Hf, Ta, Sc, B, Mo Ag, Al or combination thereof on the first underlayer, and a third underlayer comprising Cr or a Cr alloy layer having V, Mo, W, Ta, Mn, Ru, Nb or combination thereof on the second underlayer. Preferably, the first underlayer comprises substantially pure Cr, the second underlayer is preferably binary or ternary Cr alloy with substantially no Co, and the third underlayer is preferably ternary Cr alloy.

The first underlayer can comprise Cr in an amount of about 90 at. % or more. The Cr alloys employed for the second underlayer can comprise Cr and an alloying element Hf, Ta, Sc, B, Mo Ag, or Al, typically in an amount of about 0.1 to about 50 at. %, preferably in an amount of 0.2 to 35 at. %, more preferably in an amount of 0.5 to 15 at. %. The Cr alloys employed for the third underlayer can comprise Cr and an alloying element V, Mo, W, Ta, Mn, Ru, Nb, typically in an amount of about 0.1 to about 50 at. %, preferably in an amount of 0.2 to 35 at. %, more preferably in an amount of 0.5 to 15 at. %.

In accordance with embodiments of this invention, the substrates that may be used in the invention include glass, glass-ceramic, NiP/aluminum, metal alloys, plastic/polymer material, ceramic, glass-polymer, composite materials or other non-magnetic materials.

Magnetic recording media in accordance with the present invention can comprise a magnetic layer containing any magnetic material conventionally employed in the manufacture of magnetic recording media, such as a Co alloy, e.g. Co—Cr-tantalum (Ta) alloys, Co—Cr-platinum (Pt) alloys, CoCrNi alloys or CoCrPtTa alloys.

In various embodiments of the present invention, the first, second and third underlayers can be deposited at a same or different thickness of about 1 micron to about 100 microns, e.g. about 20 microns to about 60 microns.

The use of an underlayer structure, particularly triple underlayer structure was found to yield particularly advantageously high Hr, low medium noise and narrow transitions. Advantageously, conventional manufacturing techniques and production equipment can be employed to produce magnetic recording media in accordance with the present invention. For example, the underlayers can be sputter deposited on a smooth glass substrate in a DC magnetron sputtering apparatus while maintaining the base pressure below $10^{-7}$ Torr., heating the substrate at a temperature in an excess of 100° C. and maintaining the sputtering pressure at about 5 to about 15 mTorr. Magnetic layers can be epitaxially grown on the third underlayer or on subsequent layer on the third underlayer.

Embodiments of the present invention for AFC and conventional media are schematically illustrated in FIG. 2 and comprise a substrate, such as a glass, ceramic, glass-ceramic material, or NiP coated textured aluminum. The substrate is sequentially sputter deposited on each side with the first, second and third underlayers, an intermediate layer, a spacer layer for the AFC medium, a magnetic alloy layer, and a protective overcoat such as a carbon-containing protective overcoat. Although not shown for illustrative convenience, a lubricant topcoat could be applied on the protective overcoat.

EXAMPLES 95 mm diameter NiP/Al textured disc substrates having a NiP layer in the thickness range of 50 to 1,000 microns were used for making the samples, which were sputtered as both conventional and AFC thin film media at moderate temperature using a pass-by sputtering system. The NiP layer could be sputter deposited or electro-less plated on a metal or glass disc substrate. The first underlayer that growth on top of the substrate was a substantially pure chromium alloy having a thickness between 10–100 Å to maintain the grain enlargement and segregation effect.

The 10–100 Å thick second underlayer, which is preferably chromium based binary or ternary underlayer, contained 0.5–15 atomic percentage of non soluble additive element such as Hf, Ta, Sc, B, Mo, Ag and Al can be used to produce refined and uniform grain sizes.

The third underlayer is preferably composed of a ternary alloy of chromium and blended with two elements (V, Mo, W, Ta, Mn Ru, Nb) having a 10–100 Å thickness that can establish a better match of lattice constants to the subsequently deposited magnetic alloy(s) and protective layer(s).

Applicants conducted experiments to grow stacked films with and without a second underlayer of CrB having a $CrB_4$ composition in one embodiment. Through out the experiment all other layer conditions were held constant to help characterize the magnetic properties of the films. For example, the seedlayer contained NiP, the first underlayer contained Cr, the third underlayer contained CrMoTa, the intermediate layer contained CoCrTa, the spacer layer contained RuFe and the magnetic layer contained CoCrPtB.

The results of the experiments are summarized in Table 1 below, which indicate that the insertion of CrB (here, $CrB_4$) as the second underlayer improves the magnetic properties.

TABLE 1

| Note | Hc (Oe) | MrT (memu/cm2) | S* | MFA (mV) | Med-ESNR (dB) | Ontrk err 10E− |
|---|---|---|---|---|---|---|
| No CrB | 4638 | 0.348 | 0.873 | 1.398 | 15.43 | 5.83 |
| CrB | 4734 | 0.361 | 0.877 | 1.466 | 15.70 | 6.20 |

Figure 3:
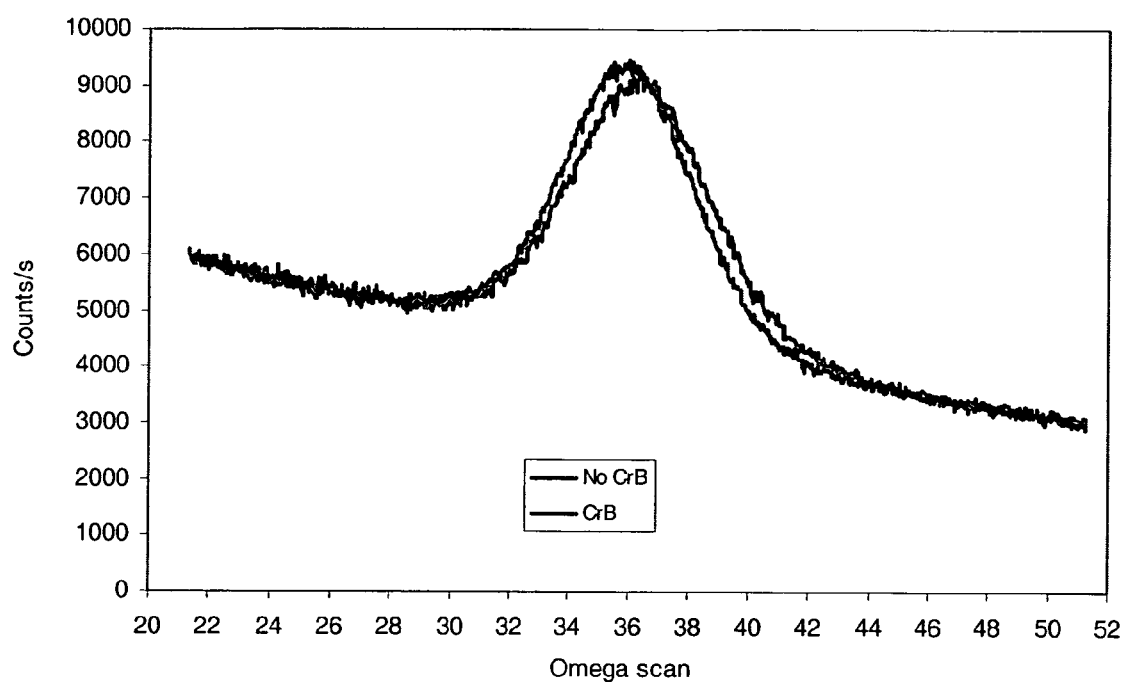
FIG. 3 show that the insertion of CrB significantly reduces out of-plane dispersion without affecting in-plane orientation.

Furthermore, X-ray diffraction measurements (XRD) measurements were made. The XRD data shown in FIG. 3 show that the insertion of CrB significantly reduces out of-plane dispersion without affecting in-plane orientation. In particular, the delta between the XRD data for samples with and without CrB is 0.49° and it improves the out of plan dispersion by 10% as shown in Table 2.

TABLE 2

| | Rocking curve FWHM | |
|---|---|---|
| | Circum. | Radial |
| No CrB | 5.4 | 10.05 |
| CrB | 4.93 | 9.64 |

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations and this invention can be practiced throughout the disclosed numerical ranges. The entire disclosure of the patents and publications referred in this application are hereby incorporated herein by reference.

The invention claimed is:

1. A magnetic recording medium comprising a non-magnetic substrate, a first underlayer comprising chromium (Cr) or a Cr alloy on the substrate, a second underlayer comprising Cr and B on the first underlayer and a third underlayer comprising an alloy of Cr on the second underlayer, and a magnetic layer on the third underlayer, further comprising an intermediate layer between the third underlayer and the magnetic layer, and a spacer layer comprising RuFe between the intermediate layer and the magnetic layer, the intermediate layer comprising a material selected from the group consisting of CoCr, CoCrTa and CoCrPt.

2. The magnetic recording medium according to claim 1, wherein the first underlayer comprises substantially pure Cr.

3. The magnetic recording medium according to claim 2, wherein the third underlayer comprises a ternary alloy of Cr and V, Mo, W, Ta, Mn, Ru, Nb or combination thereof.

4. The magnetic recording medium according to claim 3, wherein said V, Mo, W, Ta, Mn, Ru, Nb is dispersed primarily at grain boundaries of the Cr or Cr alloy.

5. The magnetic recording medium according to claim 2, wherein the second underlayer further comprises Mo.

6. A method of manufacturing a magnetic recording medium of claim 1, the method comprising obtaining the non-magnetic substrate, depositing the first underlayer comprising chromium (Cr) or a Cr alloy on the substrate, depositing the second underlayer comprising Cr and B on the first underlayer, depositing the third underlayer comprising an alloy of Cr on the second underlayer, depositing an intermediate layer, depositing a spacer layer and depositing the magnetic layer on the third underlayer.

7. The method of claim 6, wherein the first underlayer comprises substantially pure Cr.

8. The method of claim 7, wherein the second underlayer further comprises Hf, Ta, Sc, Mo Ag, Al or combination.

9. The method of claim 8, wherein said B, Hf, Ta, Sc, Mo Ag or Al is in a range of 0.1 to 35 at. %.

10. The method of claim 8, wherein said Hf, Ta, Sc, Mo Ag or Al is dispersed primarily at grain boundaries of the Cr or Cr alloy.

11. The method of claim 7, wherein the third underlayer comprises a ternary alloy of Cr and V, Mo, W, Ta, Mn, Ru, Nb or combination thereof.

12. The method of claim 11, wherein said V, Mo, W, Ta, Mn, Ru, Nb is dispersed primarily at grain boundaries of the Cr or Cr alloy.

13. The method of claim 7, wherein the second underlayer further comprises Mo.

14. A magnetic recording medium comprising a non-magnetic substrate, a first underlayer comprising chromium (Cr) or a Cr alloy on the substrate, a second underlayer comprising Cr and B on the first underlayer and a third underlayer comprising an alloy of Cr on the second underlayer, and a magnetic layer on the third underlayer, wherein the first underlayer contains substantially pure Cr, the second underlayer contains $CrB_x$, wherein $0.1 \leq x \leq 15$, the third underlayer contains CrMoTa and the magnetic layer contains CoCrPtB, the magnetic recording medium further comprising an intermediate layer containing CoCrTa and a spacer layer containing RuFe between the third underlayer and the magnetic layer.

15. A magnetic recording medium comprising a non-magnetic substrate, a first underlayer comprising chromium (Cr) or a Cr alloy, a second underlayer comprising Cr and B, a third underlayer comprising an alloy of Cr, an intermediate layer comprising Co and Cr, a spacer layer comprising Ru and Fe and a magnetic layer.

* * * * *